United States Patent Office 3,530,381
Patented Sept. 22, 1970

3,530,381
VOTING CIRCUIT CONTROL APPARATUS FOR MULTIPLE APERTURE PARTICLE ANALYZING DEVICE
Walter Robert Hogg, Robert Ivan Klein, and Carl Burgess Hayes, Hialeah, Fla., assignors to Coulter Electronics, Inc., Hialeah, Fla., a corporation of Illinois
Filed Jan. 15, 1968, Ser. No. 697,985
Int. Cl. G01n 27/00; G06f 7/38; G06g 7/14
U.S. Cl. 324—71                                   35 Claims

ABSTRACT OF THE DISCLOSURE

Apparatus for use with a particle analyzing device of the type which uses the electronic scanning principle based upon the movement of a liquid suspension of particles relative to an electric field established in a minute aperture, the field being any suitable form such as an electric current, and the movement of particles through the aperture serving to cause momentary changes in the field which may be detected, such changes being proportional to the size of the respective particles which caused the same. The apparatus with which the invention is concerned uses multiple apertures with a detector for each aperture and circuitry for obtaining a count from each detector in the form of an accumulated count signal. The redundancy of so-called count channels provides a measure of accuracy where the same size of aperture is used and the same sample scanned by signal-producing means having substantially the same circuit responses for each channel. The average of all readings will be an excellent statistical value. Time may be saved by this arrangement. Plugging of the apertures will occur, but rarely more than one at a time, and a voting circuit is used to cut out the channel which gives a signal count that is different from the other two. Thus, all channels are connected to an averaging device and the count period starts and proceeds. As the counts accumulate in the respective channels their output voltages increase, are averaged in the averaging device, and will be read at the end of the count time. If one should in the meantime develop a blockage, its signal will be removed from the averaging device by means of the voting circuit.

---

All of the above is known from a previous application, this invention relating to adjusting the limit of signal level of any channel which will result in rejection of that channel's count signal.

Pairs of channels are compared according to the previous application and the invention herein, or as newly disclosed herein, each channel may be compared with the average. The comparison signal is then required to pass through a threshold circuit whose threshold level must be adjusted to some values which will pass the abnormal comparison signals to the voting circuit which follows. This invention is concerned with such a circuit in which the threshold level of all threshold circuits varies in accordance with certain information provided. A parabolic circuit is used to control the level of the threshold circuits or several parabolic circuits may be used. In its most basic form, one parabolic circuit has its input coupled to one of the multiplicity of channels to respond to the value of count signal therein, and its output is used to control all threshold levels. One parabolic circuit may be connected to average two or more of the count signals on the channels and be connected to control the threshold levels of all threshold circuits. The averaging may be done at the outputs of the count accumulating signal producing means, or conveniently can be done at the output of the signal averaging means which is used finally to average the counts in the plural channels.

Several parabolic circuits can be used with advantage, by connecting them through averaging devices to the pairs of channels that serve the comparators and then applying their respective outputs to the threshold circuits which correspond respectively. Greater reliability and independence of operation are achieved. A practical example averages all channels of a group of three and uses this for deriving the output of the parabolic circuit that controls all three threshold levels. Groups of three are convenient because they represent three permutations of pairs, easily handled with little complexity, especially in the voting logic circuits.

In the case of the practical example using the average of three counts, if one is rejected, the parabolic circuit will become inoperative if the other two should drop out, even momentarily. This momentary "abnormality" may occur in a variable threshold circuit, but will not mean anything objectionable. In the case of the use of three parabolic circuits serving three pairs of channels, momentary discontinuation of any channel signal is not fatal to the entire run, since it will repair itself and still give good statistics. In the case of the single parabolic circuit responding to the average of three channels in a three channel group, structure is provided which locks two channels into averaging condition when any one is cut off, so that there will continue to be an averaging signal to which the parabolic circuit may respond, and so that momentary excursions from the permissible limits of the remaining threshold circuits will not result in complete loss of data from the run. Where the excursion or departure from the limit is substantial as for example caused by a blockage which would render the remaining two signals invalid in any event, the circuit will reject the two remaining and there will be no output signals to be averaged. Circuitry is provided which affords this feature.

The theory of the parabolic circuit is that it varies the threshold levels in accordance with the standard deviation to give continuous good statistics to the determinations. Novelty lies in the use of simple circuits utilized to approximate very closely a theoretically correct parabolic characteristic.

Although the invention is concerned only with counting, the signal-producing apparatus is usable simultaneously for sizing studies, and the structure of the invention may be modified to assist in such studies, as for example, by the use of disabling signals removing the output of the signal-producing channel which becomes abnormal from the sizing apparatus.

Many structure variations are included in the disclosure.

CROSS REFERENCE TO RELATED APPLICATIONS

The invention herein is primarily concerned with improvements upon the voting structure of apparatus disclosed in co-pending application Ser. No. 527,146, filed Feb. 14, 1966 by Wallace H. Coulter and Walter R. Hogg, entitled "Particle Analyzing Apparatus and Method Utilizing Multiple Apertures," now Pat. 3,444,463, issued May 13, 1969. The improvements specifically derive from a novel manner of controlling the limits of the threshold circuits which in turn control the voting operation as described in said copending application. One of the applicants herein is the same Walter R. Hogg above referred to as co-applicant of said co-pending application Ser. No. 527,146.

An appreciation of some of the problems involved in the type of apparatus with which the invention herein is concerned may be gained by consideration of a structure which could utilize the invention and which is disclosed in co-pending application Ser. No. 631,284, filed Apr. 17, 1967 by Robert I. Klein and William F. Rothermel, entitled "Automatic Apparatus for Processing Blood or the Like to Obtain Certain Parameters." One of the applicants herein is the same Robert I. Klein referred to as co-applicant in said copending application Ser. No. 631,284.

Both of the above applications and that herein are owned by the same assignee.

BACKGROUND OF THE INVENTION

The invention herein is primarily concerned with a voting circuit for a multiple aperture particle analyzing device in which the validity of results is improved because it takes into consideration not only the departure of the count in each channel from one another, but additionally takes into consideration the deviation of results from each other or an approximate average or mean.

The average above statement describes the basic objective of the invention, and in order to give this statement meaning reference should be had to the state of the art as well as the disclosures of at least one of the two applications mentioned above.

A basic tool in particle analysis is the device known today as the "Coulter Counter," an apparatus that utilizes the principles disclosed in U.S. Pat. 2,656,508. In such apparatus, a flow path is established for a suspension of particles in a suitable diluent, such flow path is microscopic, and is commercially fabricated by providing a minute hole in a corundum wafer, securing the wafer in the wall of a tube of glass, immersing the aperture tube (as it is called) into a quantity of the suspension contained in a glass beaker, then sucking the suspension through the aperture from the beaker to the interior of the tube. On its interior, the tube has a body of liquid connected in a closed liquid system to a syphon manometer or the like by means of which the differential pressure above the body of liquid in the beaker and coupled to the liquid within the tube causes the flow of diluent into the interior of the tube. By any suitable means the volume of the flow is metered so that an accurate measure is obtained of the volume of suspension passed. Simultaneous with this liquid flow, an electric field is produced in the aperture by the use of suitable electrodes at the ends or transverse of the aperture. These electrodes are connected to detecting means responsive to any change in the electrical character of the liquid contained within the effective volume of the aperture. The change of electrical character may be a change of resistance or impedance, and it has been found that the change is very nearly proportional to the volume and hence size of the particle passing through. This principle is well known and is the basis for many particulate studies in biology and medicine, and as well in industry.

The description above presents one example of the structure using the principle mentioned, and many variations in the details have been made. As described in the co-pending application Ser. No. 527,146 commercial versions of the Coulter Counter have used single threshold level and multiple threshold level circuits for discriminating between pulses of different height, such pulses representing particles of different size being scanned at the aperture. Also in said co-pending application Ser. No. 527,146, there are described in detail many of the problems concerned with obtaining greater accuracy and automation in making particle analyses by the use of such apparatus.

It is described in said co-pending application Ser. No. 527,146 that there are many advantages in using plural apertures for analyzing particulate systems. Several types of situations are discussed, including those where the apertures are of different size to obtain better information over a wider dynamic range of particle size. The one structure with which this invention is concerned is that in which the apertures are all of the same size and are scanning the same particulate sample to give greater reliability than one aperture. The question of particle size is not involved in the application herein, although adjustments for such can be made, but rather the only information sought is accurate count.

It is readily seen that if three apertures are used for the same time that one would be used and the count from each accumulated and averaged, the result will be a better value of count because of larger statistical sample has been measured. One can readily perceive that there is a saving in time if this can be done reliably, since one may obtain the same count in one-third the time normally used with one aperture. Unfortunately one of the most difficult problems which besets the type of apparatus that depends upon flow through a small hole is the blockage or partial blockage of the hole. An average of a plurality of counts must be made with apertures that are clear and pass the same quantity of suspension, since among other effects, the decrease in flow of any one will likewise decrease the number of particles which is scanned at that aperture.

The operator of the apparatus has the ability to judge whether all counts from a plurality of apertures are to be considered in computing the average since the blocked aperture will have substantially less count than the others. The commercial apparatus have in the past had some means for assisting in a determination of whether an aperture is blocked or not, this comprising a cathode ray oscilloscope to watch the electronic pulses and a microscope trained on the aperture. More recently, a projection of the aperture upon a screen provides a side-by-side view of the same with the cathode ray oscilloscope.

This manual procedure, that is, watching the apertures and oscilloscope and making a decision as to which of the counts are to be used and which are not, to a great extent limits the capability of apparatus which utilizes multiple apertures, and so circuitry is described in said co-pending application 527,146 on the basis of which a multiple aperture device may be used in an automatic or unattended apparatus with confidence. Briefly, a voting circuit is used to compare counts from separate channels, the normal ones are permitted to pass into an averaging device, and the abnormal one is dropped out.

The voting circuit of said co-pending application and those disclosed herein have certain aspects in common which will be described. This is explained in connection with three channels, the most practical number of apertures to be used since the resulting circuitry is not very complex and the inter-channel relationships are convenient. Specifically, if there are three channels designated A, B and C, there is a permutation of three pairs AB, AC and BC. A comparison circuit is easily constructed to compare channels to achieve the inter-channel relationships. If one channel produces a bad count due to blockage, two differences will be high and the third low. Obviously the third difference will clearly point to the valid counts, and thus through logic circuits, the count from the abnormal channel is switched out of the circuit, and the counts from the other two go to the averaging device. If one of the remaining channels goes off, the voting logic circuit will reject both.

Specifically, one may use differential amplifiers connected to the respective channels and there will be three such amplifiers to cover the permutations of pairs. Since there must be a practical limit to the permissible range of comparison signals, a threshold circuit follows each amplifier, the level of the threshold being set to some value which will be discussed at length hereinafter, and which is the area of the voting circuit with which the invention is primarily involved. Suffice it to say at this point that the operator may adjust the threshold level to some value which he has chosen from knowledge of the particulate system being studied, and that any time the comparison signal exceeds this level, this fact will be indicated by the state of the output from the threshold circuit.

Whether or not an abnormal count results in an output signal from the threshold circuit depends upon whether positive or negative logic is used. Logic elements sense the output signals from the threshold circuits and operate switches which pass the accumulated count signals to the averaging device.

If the particulate systems which are being studied for the most part comprise suspensions having populations which do not vary a substantial amount from some count, the problem of adjusting the threshold level of the threshold circuits is easily solved by having a simple manual adjustment which can be set by the operator and changed from time to time as he may desire. It can be appreciated that this will limit the usefulness of the apparatus unless the operator makes a statistical analysis of the counts and adjusts the limits of the threshold levels accordingly. If the systems which are being counted vary in total count over wide ranges, manual adjustment of the threshold levels can result in substantial inaccuracy unless the threshold levels are set so low that an excessive number of determinations is discarded.

Consider a number of particulate systems which are to be counted by the use of an apparatus having a plurality of apertures. The differences between counts in the respective channels may be indicative of normal or abnormal counts, depending upon their actual difference in the first instance, but even more important, depending upon the relation between the count difference and the average value of total count. Consider two extremes for illustrating the point. If the apparatus is being used to count particles in a system in which the total number of particles counted within the counting period is on the average 50,000 and there is a difference between channels A and B of 500 particles, the difference is only one percent of the average count, and the two statistics would certainly be acceptable such that one would want to include both in computing the average number of particles in the measured samples. If, however, the apparatus was being used to count particles in a system in which the total number of particles counted within the counting period is on the average 5,000 particles and there is a difference between channels A and B of the same number as in the first case, namely 500 particles, the difference between counts is 10% and one would not be as willing to accept both counts for the average. Obviously, a difference of 500 particles between two counts which average 2000 or less becomes more and more questionable as a valid count of the same system.

Obviously then, a fixed threshold level responsive to total difference between counts and not considering the average value of count has a potential for producing error and unreliability if too large, and will decrease utility of the apparatus if too small.

The problem of automatically voting in the case of multiple apertures is rendered more acute in a structure of the type which is disclosed in the second co-pending application Ser. No. 631,284 mentioned hereinabove. In that structure, blood samples are being processed to achieve certain indices related to the white and red blood cells, and included in these indices are the red blood cell count and the white blood cell count. Samples are drawn into the apparatus at fifteen second intervals, and likewise it is required that the apparatus print out a white blood cell count and a red blood cell count every fifteen seconds. Moreover, each sample of whole blood may have been taken from a completely different patient, so that the machine must operate completely automatically.

According to the disclosure, the whole blood sample is drawn in, diluted first to obtain the white blood cell sample, and a portion of this is in turn diluted to obtain the red blood cell sample. The white blood cell dilution is lysed and run into a vessel which has three aperture tubes immersed therein, the system drawing the lysed dilution through the apertures simultaneously and producing thereby three theoretically identical counts within a given time which may be averaged to give an accurate count that the apparatus converts into a printed number. At the same time, the red blood cell dilution is independently run into another vessel in which there are also three aperture tubes, the suspension drawn into these three, three red blood cell counts obtained within the given time, these averaged and read out by the printer. The vessels may be within the apparatus and incapable of being seen by the operator, although the structure described includes means for projecting the images of the apertures and displaying the pulses on cathode ray oscilloscopes. In any event, the machine is intended to operate continuously and with great speed, such that there is no opportunity for computing and re-adjusting the thresholds between fifteen second runs.

Clogging or blockage is almost impossible to avoid completely and a structure for voting can be built into the apparatus to discard counts which depart from the normal by some degree which will give the maximum of statistical reliability.

It has been found that if the threshold circuits of the voting structure have their levels controlled in accordance with a parabolic function that depends upon the average value of the counts being compared then the optimum statistical results will be achieved The number of counts discarded will be a minimum and the number of counts used will be a maximum The achievement of this end and the provision of structure for causing such achievement form the principal object of the invention.

Other objects of the invention are concerned with the provision of structure for achieving the object above described, including the provision of parabolic circuits which receive their inputs from the accumulated count signals of the channels and have their outputs connected to the threshold circuits so that the threshold levels in effect vary as the deviation of the differences based upon factors to be described.

In connection with the deviation mentioned, a simplified discussion of the basic statistical concepts of the invention is hereinafter set forth. In the specification reference is made to a value or statistical index $s$ which is used in constructing the circuits to achieve the necessary voting by adjustment of threshold level. This index is closely related to an index which is known in statistics as "standard deviation," a measure of how closely a given measurement of a system may be expected to fall relative to the true mean. It is taken herein to be the square root of any given count, and from known studies, it is presumed that there is a 68% probability that all measurements made will fall within plus or minus the square root of the true mean value. The same studies enable a presumption to be made that 95% of all measurements will fall within plus or minus twice the square root of the true means value.

Applying this to the structure which the invention provides, if the limit of all of the threshold levels can be varied in accordance with $s$, any time that the difference between two counts falls within the limit, the chances are 68% that the counts are valid and should be acceptable. The raising of the limit to $2s$ will give less accurate results since any time that the difference falls within this limit, chances are 95% that the count is valid, since more counts will be accepted, albeit having much greater deviation, and thereby more likely to include some which are invalid.

An important object of the invention is to construct apparatus which varies the thresholds automatically in accordance with the index $s$ or some part or multiple thereof, such that the apparatus will automatically vote for the maximum of valid results irrespective of variation of the actual value of the true count of each particulate system measured.

Other objects of the invention are concerned with the provision of various apparatus for accomplishing the principal purposes of the invention. Such apparatus take the form of different arrangements for driving the parabolic circuits and the variations of the voting circuit to take into account the characteristics of these arrangements. For example, there could be one parabolic circuit whose input is obtained by averaging all of the counts of the three channels subject to voting, the output of the one parabolic circuit being used to vary all threshold levels.

In a structure of this type, as in others described, loss of one channel voted out for a transistory reason and thereafter re-established is of no consequence. The particular structure would irretrievably vote out the remaining two channels if one goes abnormal, even of a moment, invalidating data which would otherwise be useful. This problem is solved in such structures by locking in the remaining channels when one is voted out, as detailed hereinafter.

Other examples use multiple parabolic circuits which may not give rise to the problem mentioned above.

The construction of a simulated or approximate parabolic circuit is achieved as another object of the invention.

Other objects and advantages will occur to those skilled in the art without the need for detailing them further.

SUMMARY OF THE INVENTION

According the the invention, apparatus is provided having the general structure of the co-pending application Ser. No. 527,146 including the plurality of at least three channels each accumulating a signal representing count, and each operating into a signal averaging device which will average all counts if they are all accepted. Also included are three comparators, each connected to a pair of channels, covering thereby the permutations of the three channels in pairs, and each comparator produces an output which represents a difference signal between the two channels which serve its input. Another novel arrangement has each comparator connected to one channel and also connected to an averaging device responding to the counts of all three channels. Each comparator also includes a threshold circuit, the outputs from the threshold circuits operating into a logic network which accepts or discards by operating switches in the several channels. Any abnormal channel is cut off of that when the measurement time has been completed and the readout device is energized, it will only see the average of the two normal channels. In the prior structure of said co-pending application, no specific arrangement was described for automatically varying the thresholds based upon any measurement.

The comparators, threshold circuits, logic network and switches were termed voting structure in the said co-pending application, and in this invention the improvement is concerned with means for providing automatic variation of the threshold level. The basic structure senses the average value of count from the channels and produces an output which is a parabolic function thereof, that is, (1) $$e_o = K\sqrt{e_i}$$

where $e_0$ is the output signal of the parabolic circuit,
$e_i$ is the input signal of the parabolic circuit, and
K is some constant.

Structures are disclosed and claimed differing from one another in the manner in which the input voltage $e_i$ is achieved. In one structure, there is a parabolic circuit for each pair of channels, making a total of three such parabolic circuits. A comparator which may include an absolute value generator such as a differential amplifier and full wave rectifier and a simple threshold circuit is connected between one pair of channels and the logic network. That same latter-mentioned pair of channels also drives a parabolic circuit after being average, and the output of the said circuit is connected to the threshold circuit of the comparator served by the same pair of channels.

This first structure thus has three parabolic circuits, each of which may produce a different output, each driving one threshold circuit in accordance with a function $s$ derived from the average between two accumulated counts. This particular form of apparatus need have no significant difference over that of the co-pending application considering the circuit between the threshold circuit outputs and the averaging device.

A second structure utilizes only one paraboilc circuit, and this one is coupled to the averaging device into which all channels operate so that in effect the signal averaging device operates the parabolic circuit. A simple variation could average the channel counts right at the integrator outputs. The output from the parabolic circuit is then connected to all three threshold circuits to adjust their levels. In this case there is economy of components and the average value of counts is the average of all three so that it will be somewhat more precise than embodiments using permultations of pairs, because abnormal counts have less "weight." Structure is included in this circuit to provide for the disabling or discarding of one channel count to cause the other two channels to become locked against disablement in case of momentary departures of comparison signals from normal.

BRIEF DESCRIPTION OF THE DRAWINGS

FIG. 3 is a circuit diagram of a network whose characteristics closely simulate or approach parabolic, this network being suitable for use in the structure of the invention wherever a parabolic circuit or network is called for.

DESCRIPTION OF THE PREFERRED EMBODIMENTS

As indicated, the basic concept of the invention is the provision of some structure which responds to the total count being considered to ascertain whether the difference between two counts is normal or abnormal. To explain the preferred embodiments without a discussion of the theory might lead to some misunderstanding of the definitions of the language and expressions used in the specification and claims, hence this preliminary discussion will be directed to theory, but may be considered as defining terms as well.

Since the apparatus which is being utilized is constructed in accordance with the principles of U.S. Pat. 2,656,508, the manner in which the output of this apparatus enters into the invention is important to an explanation. The particles passing through the aperture of the Coulter apparatus are scanned, produce signals, and these signals are proportional to the size of the respective particles which moved through the aperture in producing them. In a commercial Coulter apparatus, the signals may be used in two ways. They may be counted or they may be sized. A combination of these may be accomplished through the use of threshold circuits, all of which is well-known in the art of particle analysis at this time. The normal detector of a device of this kind includes suitable amplifiers which can drive one-by-one counters, this being in effect a digital read-out. The output is controlled by the threshold circuits to accept or reject pulses of varying amplitudes to obtain size distribution or the like.

In the apparatus of this invention, the only product of the Coulter apparatus which is involved is the count of pulses. Accordingly, the the block diagrams illustrate inputs on their left which commence with count signals in no way related to size. In the second-mentioned copending application Ser. No. 631,284, the machine disclosed is required to count red and white blood cells irrespective of their size, but the same machine is expected to provide an index known as mean cell volume, and this latter index requires information related to particle size. Accordingly, although not shown in the apparatus herein illustrated or described, size information from the apparatus may be derived for use in another apparatus, such as an MCV meter, and this may be obtained from one or more channels.

The invention likewise is concerned with apparatus which uses several apertures, instead of one. Where one aperture is being used, and it blocks the loses its signal, or starts producing spurious signals, the visual and manual detecting and rejection of the data is a relatively simple matter. The difficulty arises when one of a group of unattended aperture plugs or commences producing spurious signals. Groups are used for decreasing scanning time, for reliability and for good statistics, all of these being important in automatic equipment. Since the invention is concerned with counting only, it may be assumed that the groups of apertures referred to herein will all be identical (or nearly so) in size, and likewise that each aperture will be connected to detector circuitry which closely approximates in characteristics the other detectors. In other words, exact duplication of the apparatus is desired. Reference is made to signal-producing means in the specification and claims. This would be the apertures with their respective detector circuits, and the signals would obviously be the outputs from the detectors.

While it is practical and best to attempt duplicating the apertures and their circuits, it should be recognized that differences between signal-producing means can be adjusted and compensated for, electrically and statistically, so that by the time the count signals reach the apparatus of this invention, all channels are producing the same theoretical counts. No further mention will be made of this point hereinafter, but it will be taken that although reference will be had to the same apertures and signal-producing means, the variations from exact duplications that can be made will be understood.

Since a count accumulated signal is the best type of electrical characteristic which can be read easily by an electrical device, and since the apparatus herein is only concerned with counting, some structure is needed preliminary to the averaging device to convert the continuously arriving string of pulses into an accumulated count signal. In the copending application one form of this structure is described, and in this disclosure that structure is represented by a simple block labeled "Pulse Count." In the claims, this structure is called a pulse count accumulating circuit and its output is an accumulated count signal, that is, a voltage which is proportional to the accumulated count of the pulses from the signal-producing means (aperture and detector circuitry). The accumulated count signal is analog while the ordinary Coulter Counter provides a digital output to its counters. If the pulses are all clipped to a constant amplitude, run into an integrator using a pump circuit, the integrator will accumulate a charge proportional to the number of pulses. This charge, divided by the value of the capacitance in which it is stored, provides the voltage signal needed, and obviously, if the rate of flow of the suspension through the apertures is constant and equal, the voltage output of all of the integrators will be substantially equal at any time and will increase linearly. This situation is illustrated in the average characteristics displayed on the graphs of the drawings and will be described in detail below.

For multiple apertures, the outputs are averaged for achieving the average count per channel, and hence the accumulated count signals are applied directly to an averaging device, and the output read as the average of all of the channels. This assumes no blockage problems.

Reference is made throughout the specification and claims to channels. In this application, the word channel has no size or range significance. It is used in a broad sense to signify the entire path of information for each count, starting from its aperture and continuing through its detector, amplifiers, pulse count accumulating circuit, connecting lines, and finally running into the averaging device. Switching devices or circuits are referred to herein, and there will be one such circuit connected between the pulse count accumulating circuit and the averaging device, in series therewith, so that one could say that the switching device is connected into the channel or controls the channel. There will be as many channels as apertures, and as many accumulated count signals as channels.

Another explanatory note relates to the number of channels in any group having a voting structure. The simplest group to work with is three, because this utilizes the minimum number of components and is most convenient. The statistics are good, and the group provides only three permutations of pairs to be considered in devising a circuit. The claims are written about structure using "at least" three channels, and in their body they detail the elements relating only to a grouping of three. What is intended by this is to include the type of structure which could use more than three channels, applying the principles explained in connection with a group of three. The voting operation as well as the adjustment of threshold can be accomplished with groups of four and even more, but the further moderate improvements in reliability thus attained by further iteration of required circuitry do not usually justify the increased expense.

In the structure of this invention, in order to accomplish the voting, it is necessary to establish comparison signals to operate the voting circuits. The nature of these signals will be described below, but at this point, a definition is given of the phrase "differential comparator" which is used in the claims. The function of the comparator is to examine the count signals from the pulse count accumulating circuits and indicate the differences between them to enable voting to proceed. The differential comparator is connected in one of two different ways, but the end result is intended to be the production of a comparison signal. In one embodiment, considering groups of three, each pair of the permutation pairs is connected to the inputs of one such comparator. These connections are directly with the pulse count accumulating circuits. In a second embodiment, each channel is connected to one lead of the respective comparators, the other input lead of each comparator being connected with an averaging device that provides an average count signal obtained from all channels. The averaging may be done independent of the output averaging device, or may be achieved merely by connecting the second inputs of the several comparators to the output averaging device.

The comparators which are used in the actual circuits comprise two elements, principally. Each has a differential amplifier and a threshold circuit, the amplifier being capable of producing a signal output which is directly proportional to the absolute difference between its two inputs. Thus, the amplifier is properly called a difference signal generator. The likelihood of two channels having precisely the same count signal is quite remote, and hence it is essential that there be some range of difference between them which is considered statistically not great enough to warrant rejection of either one. This function is handled by the threshold circuit, whose threshold level is adjusted to provide the necessary comparison signal that operates the voting circuit. The differential comparator may be a circuit of components which performs the same functions described for the differential amplifier and threshold circuit without utilizing these specific devices. The important requirements of this part of the device is that it must function to produce a comparison signal, and there must be a response limit varying mechanism associated with such device. In the described structures, this latter mechanism is the threshold circuit whose limit can be varied. The nature of the variation forms one of the most important features of the invention.

As stated above, the likelihood of two channels producing the same count signal is remote. The differential comparator would be continuously producing an output if there were no limits to its response, and the voting circuit would be operating continuously as well. In the co-pending application Ser. No. 527,146 this fact was considered in providing means for setting the threshold levels of the apparatus at some arbitrarily chosen values. Such choice would have to be based upon experience and experiment. In the invention herein, the threshold levels are adjusted automatically on the basis of the count signals of the channels. A circuit is used to compute the value of $s$ or standard deviation and the output of this circuit is then used to vary the threshold. Accordingly, the equation of the parabolic function of (1) above becomes (2) $$e_{th}=Ks$$

where $e_{th}$ is the voltage applied to the threshold level circuit to vary its response, $s$ is approximately the square root of the accumulated count signal or of an average of two or more accumulated count signals, and K is a constant.

The factor $s$ is quite similar to the concept mentioned as standard deviation and is also known in statistics as "sigma."

The claims refer to a comparison signal. Generally, the voting circuit which follows the differential comparators and into which the outputs from the threshold circuits are applied, will respond to signal outputs and will not respond to the absence thereof. Thus, as will be noted in the block diagrams, the basic voting network is formed of three AND logic elements, none of which will produce an output until and unless both of its inputs have signals applied thereto. The threshold circuits are therefore intended to produce outputs only when their respective response limits are exceeded. This means that there is no output signal from any threshold circuit when both inputs to the differential amplifier serving it are substantially equal or close enough so that the amplifier output does not exceed the threshold limit. The comparison signal from the threshold circuit will be a voltage representing large difference between accumulated count signals. The absence of voltage from the threshold circuit may also be considered a form of comparison signal, since it signifies that conditions are acceptable in the channels being compared (or in the channel being compared with the average accumulated count signal). This definition of comparison signal should be understood in reading the claims. There is another significant aspect to this definition, as well. The logic circuits herein will generally be assumed to be based on positive logic, using AND and OR gates, but it will be apparent to those skilled in the art that equivalent devices may be constructed using NAND and NOR gates, negative logic, and hybrids of all of these.

In the claims, reference is made to switching circuits. These circuits are the control elements operated by the voting logic circuit. The accumulated count signals will be applied directly into the average device if these switching circuits are all inoperative and the switches in effect closed. If any one should be energized, that channel controlled will be opened, and its count signal not included in the output. The voting logic circuit is the means responsive to the comparison signals and this operates the switching devices or circuits. Field effect transistors are ideal for use as switches in the circuitry of the invention at these points.

Figure 1:
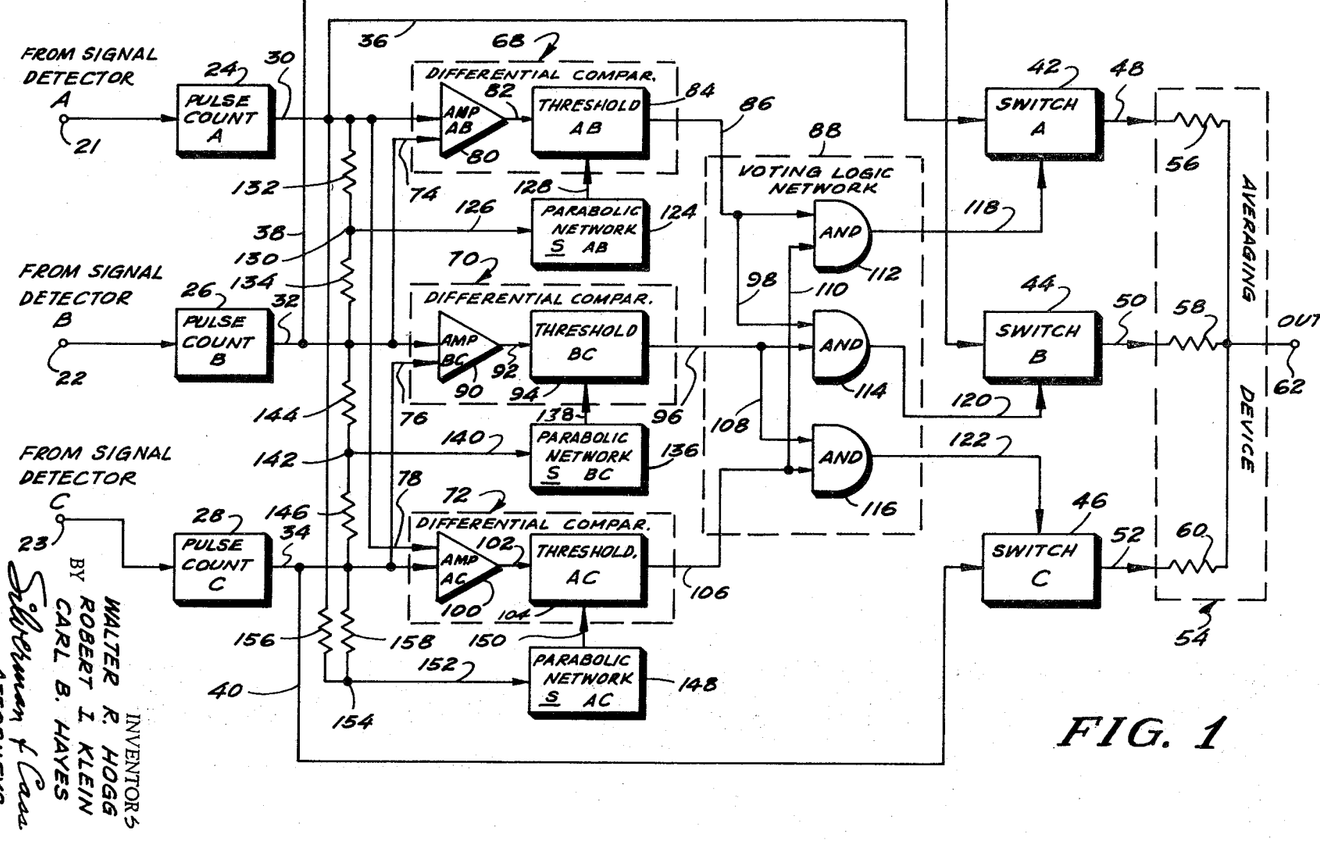
FIG. 1 is a block diagram illustrating a voting structure with variable differential comparator response limits embodying the invention, the structure in this instance utilizing three parabolic networks or circuits for adjusting the response limits of the differential comparators.
Figure 2:
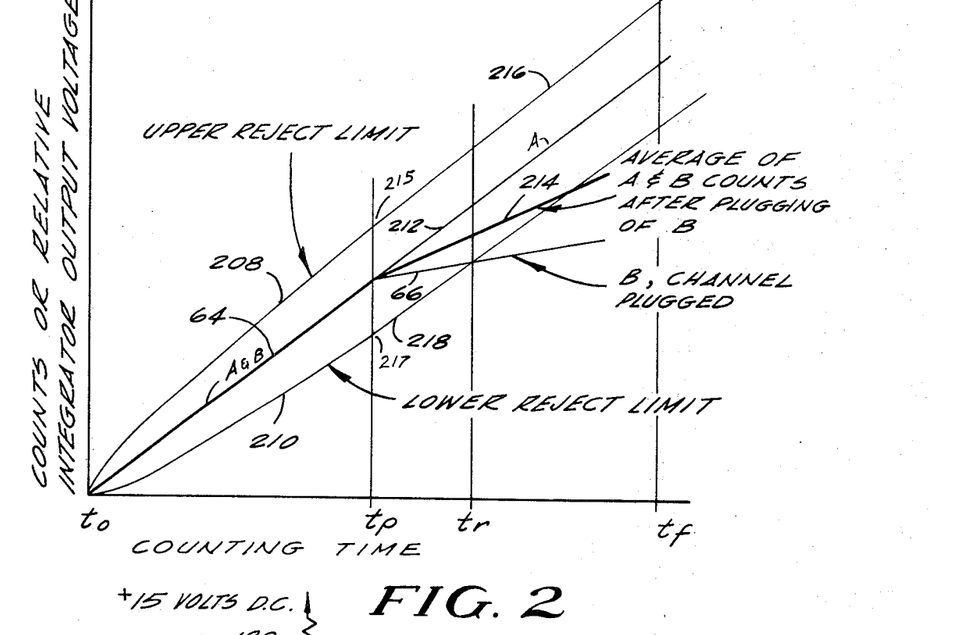
FIG. 2 is a graph or chart illustrating the performance of a structure of the general form illustrated in FIG. 1.

Referring now to FIG. 1 and the graph of FIG. 2, the block diagram of FIG. 1 illustrates a preferred form of the invention which utilizes three channels in permuted pairs for controlling the response limits of the differential comparators. The channels are designated generally A, B and C for convenience, although as explained above more than three could be used. The count signals comprise strings of pulses from the signal detectors and these are derived from the type of apparatus described in said U.S. Pat. No. 2,656,508. These are applied at the left-hand terminals 21, 22 and 23, it being expected in this case that all will be substantially equal, since the signals will be accumulated for the same predetermined period of time. Good counts will then be averaged to get a single value.

The strings of pulses are applied to the pulse count accumulating circuits 24, 26 and 28, respectively, each serving one channel. Assuming that each count accumulating circuit provides an output which does not differ substantially from its companion outputs, the accumulated count signals will be voltages, appearing at the lines 30, 32 and 34 respectively, and will also appear on the connecting lines 36, 38 and 40 respectively. These pass through the switch circuits 42, 44 and 46, respectively, all of the switches being effectively closed to permit the outputs at 48, 50 and 52, respectively, to be applied to the averaging device 54. The averaging device 54 is here shown to be a simple matrix formed of the resistors 56, 58 and 60 all having a common output terminal 62 at which will appear the average accumulated count voltage of the three channels, A, B and C. The fact that all of the switches 42, 44 and 46 were effectively closed presumes that no part of the comparison and voting circuits operated.

In FIG. 2 the two quantities being graphed are time on the horizontal axis and voltage on the vertical axis, the chart being for the purpose of explaining the operation of the structure of FIG. 1. For simplicity only the accumulated count signals of channels A & B are described, but the operation should be understood from this. The continuous acceptable operation of the channels will result in the gradual rise of the accumulated count signal along the straight line 64 which commences at $t_o$ which is the starting time for a count, and continues until time $t_f$ which is the end of the counting period. At this time $t_f$, some readout device will respond to the voltage at the terminal 62, and the apparatus may be reset for another run. If none of the three channels becomes abnormal, as by plugging, all will follow the line 64. If this represents the voltage at 62 it will be a single line, theoretically perfectly linear except for minor fluctuations due to random arrival rate of particle pulses. If it represents the voltages at the lines 30, 32 and 34, the values will be very close to one another and the lines will vary slightly, if at all.

Reference has been made herein and will be made in the claims to abnormal count or abnormal count signals, as opposed to normal count or normal count signals. If a channel is operating and the suspension of particles in a diluent is moving through the aperture which is part of the signal detector at a constant rate, the pulses which are produced will accumulate at a substantially constant rate. This is obviously a normal type of situation, and the count signal resulting is clearly normal. If such a channel becomes suddenly blocked and the liquid flow stops, the count signal will remain at the value which it had at the instant of blockage. Its signal will thus be abnormal, since, instead of increasing along a straight line function, it will remain constant. Perhaps a few particles will be carried through the aperture, and this will slowly raise the accumulater count, but nevertheless the count will not be normal since it departs so radically from what it would be if the aperture were totally unblocked.

In FIG. 2, at the point in time $t_p$, it is assumed that the aperture of the B channel became plugged, but not totally. The line 66 represents the manner in which the count signal from this channel increased in value, and as will be seen, it is not quite horizontal, but has a positive slope representing the fact that some particles are getting through. This has little significance, however, since the signals may be generated from boiling of the diluent in or in the vicinity of the aperture, or it could represent the intermittent signal from the blocked material vibrating in the aperture, or from a wide variety of phenomena which have no validity or significance to count (or even sizing). It is clear that this signal is abnormal.

In this specification, the response limits of the differential comparators are set by means of parabolic circuits, and hence these limits are not arbitrarily chosen by the operator of the apparatus. Irrespective of its cause, as soon as the comparator produces a difference signal, which passes into the threshold circuit, of an amplitude that exceeds the limit of that threshold circuit, the circuit will produce an output signal that indicates excessive difference. The channel having the accumulated count signal which departs from the mean or the other channels is said to be the abnormal count signal-producing channel. The particular causes may be varied. For example, there could be a blockage in which the number of pulses produced in a channel decreases radically. Next there could be an obstruction which causes boiling in the aperture and the bubbles produced could cause a large number of false pulses beyond those being produced in the other apertures because of normal transit of suspension. Occasionally the true response of a channel may drop or increase for some physical reason not associated with blockage, as for example, caused by lack of homogeneity of the suspension. The threshold circuit is controlled by a parabolic circuit and it will establish a threshold level in accordance with the constants of the circuit chosen to give any degree of selectivity. As soon as the difference is beyond the limit of the threshold, the voting circuit will operate regardless of the cause. Accordingly, if one chooses a parabolic circuit to give a narrow limit, there will be instances where the difference signal will be beyond the limit of a threshold circuit for short periods of time and return to within the limit. The narrower the limit the more often this will occur, and the wider the limit chosen the less often this will occur.

In this specification, and in the claims, the word abnormal is used to describe the accumulated count signal of any channel at any time which is of value so that when compared with the average signal, or with one of the other channel signals, the difference will be beyond the limit of the threshold lever measuring such difference, so as to cause an output signal from the threshold circuit and a voting action. This definition obtains regardless of the cause of the difference.

It should be understood that where the abnormality occurs due to statistic probability, the condition will be transitory, and will revert to normal in a very short time. Under such circumstances, it is desirable that the apparatus continue to operate even after the abnormality has voted one channel out. In other words, when a channel is voted out for a short period of time and then comes back in, the average count for all channels including this one will not vary to any great extent. With apparatus of the invention this type of phenomena may be expected to happen often, without any appreciable decay of statistical validity. The problem which arises relates to situations where there is only one parabolic circuit, that depends upon an average accumulated count value for its output, that controls the threshold level limit. In such structure, once a single channel has been voted out, there remain two channels to provide the average signal for the parabolic circuit. The voting logic circuit is such that if the remaining two channels develop a difference between them that falls beyond the threshold limit of either threshold circuit, both will be voted out. If this occurs, even for a moment as might result from what has been described as a transitory abnormality, both circuits will drop out, there will be no average for the parabolic circuit, its output will drop to zero and the threshold limits will also drop to zero with a result that there will be no signals getting through for the remainder of the timing period. A special logic network is used in such a structure to lock both remaining channels into operation, if one of a group of three should be voted out.

Figure 6:
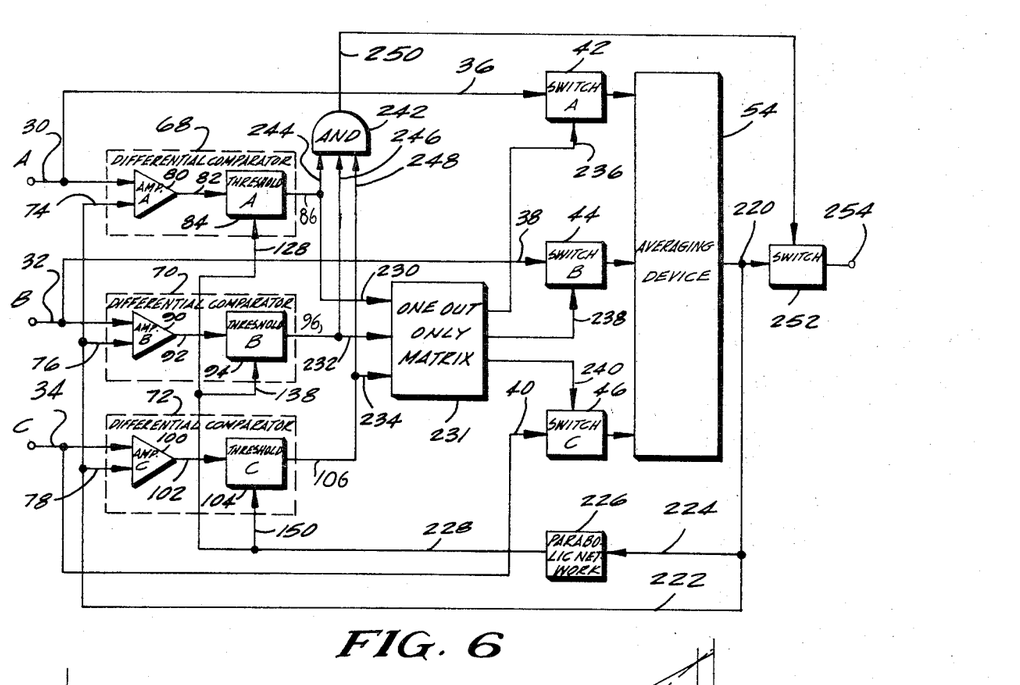
FIG. 6 is a block diagram simiar to that of FIG. 1 but illustrating another form of the invention, the structure in this instance utilizing a single parabolic network or circuit for adjusting the response limits of all differential comparators.

In the structure of FIG. 1, since the parabolic circuits do not respond to the average of all three channel accumulated count signals, but instead have a degree of independence different from the type of circuit shown in FIG. 6, for example, there is no need for this above-described lock-in arrangement.

Reverting once more to FIGS. 1 and 2, the lines 30, 32 and 34 are connected also to one input terminal each of the three differential comparators designated generally 68, 70 and 72, respectively. The upper comparator 68 is the AB comparator and it compares the signals from the channels A and B; the middle one is the BC comparator and it compares the signals from the channels B and C; and the lower one is the AC comparator since it compares the signals from the channels A and C. A line 74 extends from the lead 32 to the second input terminal of the comparator 68; a line 76 extends from the lead 34 to the second input terminal of the comparator 70; and a line 78 extends from the lead 30 to the second input of the comparator 72. Each comparator has two elements in the embodiment shown, these being a differential amplifier and a threshold circuit. The amplifiers produce an absolute difference output, and the threshold circuits have adjustable levels.

The AB amplifier is shown at 80 having its output 82 connected to the threshold circuit 84, the output from the threshold circuit being connected through the line 86 to the votting logic network 8. Similarly the BC amplifier is at 90, having its output 92 connected to the BC threshold circuit 94 whose output 96 extends to the voting logic network 88; the AC amplifier 100 has its output 102 connected through the threshold circuit 104 to lead 106 connected to the voting logic network 88. Cross leads 98, 108 and 110 are included in the connections to the network 88, as shown.

The voting logic network 88 in this case, besides the connections and cross-connections, includes three AND logic elements 112, 114 and 116, whose outputs 118, 120 and 122 respectively extend to the switching circuits 42, 44 and 46. The operation of the logic network 88 is basically as follows:

If there are no signal outputs on the leads 86, 96 and 106 there will be no inputs to any of the AND elements, and no outputs at the leads 118, 120 and 122. Thus all switching circuits 42, 44 and 46 remain in their normally closed condition. The accumulated count signals from the channels are averaged and appear at the terminal 62 as an average value. If one channel becomes abnormal, then there will be a difference signal in any comparator in which that signal participated. Assume that the channel B goes abnormal. The channels A and C remain normal, hence there will be no signal on the lead 106 since there is no substantial difference between the inputs to the comparator 72. The lead 96 will have a signal on it as will the lead 86, since the channel B in both cases is compared with one of the other channels in deriving that signal.

Looking at the three AND elements 112, 114 and 116, inputs to the element 112 are at 86 and 110. There is a signal at 86, but none at 110 so that there will be no output from this AND element. There is a signal at 108, but none at 106, and hence there is no output from the AND element 116. As for the AND element 114, its inputs 96 and 98 will both have signals and hence there will be an output at 120, the switching circuit 44 will open, and the B channel will be cut out so that its resistor 58 will not be active in producing the average signal occurring at terminal 62.

The voting described above differs to no great extent from that occurring in the structure disclosed in the copending application Ser. No. 527,146. The threshold circuits are different, however. Preferably the amplifiers 80, 90 and 100 are absolute difference amplifiers, producing for instance a negative signal irrespective of the polarity of the difference between the two signals applied at their inputs. The threshold levels of the threshold circuits 84, 94 and 104 are controlled in accordance with the mean accumulated count signals of two channels in each case. The AB threshold circuit 84 has its level controlled by the parabolic network 124 whose input is at 126 and whose output is at 128. The input line 126 connects to the terminal 130 that is located between averaging resistors 132 and 134 connected respectively to the leads 30 and 32. The terminal 130 will thus be at a voltage which is the average of the accumulated count signals on the leads 30 and 32. In a similar manner, the parabolic network 136 has its output 138 connected to control the level of the threshold circuit 94, its input 140 connected to the terminal 142, averaging resistors 144 and 146 connected to the leads 32 and 34 respectively to average the accumulated count signals of channels B and C. The parabolic network 148 controls the level of the threshold circuit 104 through its output 150 and has its input 152 connected to the signal averaging terminal 154 which is between the resistors 156 and 158 connected respectively to the leads 30 and 34 to average the accumulated count signals of the A and C channels.

These parabolic networks are in effect rudimentary computing circuits, since their inputs are operated upon by a square root function to produce thier outputs. This gives the $s$ factor described above. the outputs at 128, 138 and 150 vary as the square root of their respective inputs 126, 140 and 152. These inputs are related in each case to the average of a pair of channels, these being the several permutations of the channels A, B and C and the resulting output signal being used to vary the response limits of the differential comparator which is associated with the same pair of channels.

The structure of FIG. 1 gives a degree of independence which enables transient abnormalities to exist without affecting the overall operation of the circuit. In other words, even if one channel has been voted out, the occurrence of an abnormality in another will not drop the remaining two out completely if the abnormality should clear itself. The reason is that there are three parabolic networks and any two channels in operation at any time will give a limit signal sufficient to provide output. In other words, a total vote-out will not remain effective if two channels ever revert to a normal condition. If only one parabolic circuit was available operating from an average of the output signals of the channels, this would not be true, and the practical circuit would require an additional element as will be explained, for acceptable operation.

Figure 3:
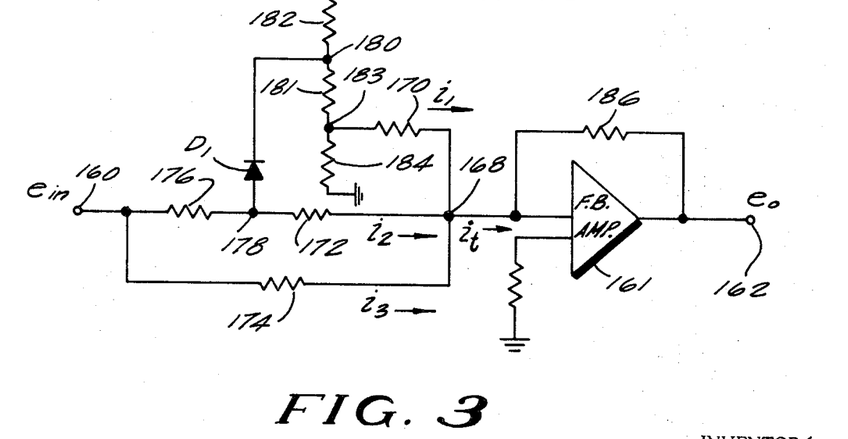

Considering now a typical parabolic network, in FIG. 3 there is illustrated a simple circuit which simulates a parabolic function closely enough for most applications. The left hand terminal 160 could be connected to the line 152, for example, in which case the right hand terminal 162 would be connected to the line 150. The signal voltage at terminal 160 is the input voltage $e_{in}$ and the output voltage $e_o$ appears at 162. These voltages are the same as those referred to in the Equation 1 above. If a perfect parabolic curve were generated, the characteristic of input and output voltages would appear like the solid line 164 in FIG. 5, this being a graph plotting such voltages. This characteristic could be matched very readily by networks that those skilled in the art can construct, but for the satisfactory operation of the device, a rough approximation is all that is necessary, and one such simulated parabolic circuit is that shown in FIG. 3. The principal portion of the network is that part to the left of the feedback amplifier 161, between the terminals 168 and 160. As will be seen from an analysis of this circuit, there are three currents which combine to make the total current $i_t$ flowing to the right of the terminal 168, these being currents $i_1$ in the upper branch through the resistor 170, the current $i_2$ in the center branch through the resistor 172 and the current $i_3$ in the lower branch through the resistor 174. The resistor 176 is connected to the terminal 178 which connects with the resistor 172 and a diode $D_1$ to the terminal 180. This point 180 is connected to a source of voltage through a resistor 182 and through resistor 181 to the resistor 170 and additionally to ground through the resistor 184. The total current $i_t$ is the sum of these currents, and the voltage at the terminal 162 is the product of the feedback amplifier resistance of the resistor 186 and the current $i_t$.

The values of the resistors of the simulated parabolic circuit of FIG. 3 are about as follows for a practical circuit:

|     | Ohms |
| --- | --- |
| 176 | 50,000 |
| 174 | 500,000 |
| 172 | 360,000 |
| 170 | 37,400 |
| 181 | 270 |
| 182 | 390 |
| 184 | 27 |
| 186 | 37,400 |

In operation, this circuit functions somewhat as follows: The apparent resistance to ground from terminal 168 is held at an extremely low value by the feedback path through resistor 186 in conjunction with the high gain of the feedback amplifier 161. Input to this amplifier is in the form of currents $i_1$, $i_2$ and $i_3$ which flow in response to the voltage impressed across the resistors 170, 172, and 174, respectively. Since the resistance from terminal 168 to ground is negligible compared to the resistances 170, 172 and 174, the right-hand end of each of these resistors may be considered grounded, and the currents which flow in them are equal to the voltages at terminals 183, 178 and 160 divided by resistances 170, 172 and 174 respectively.

Figure 4:
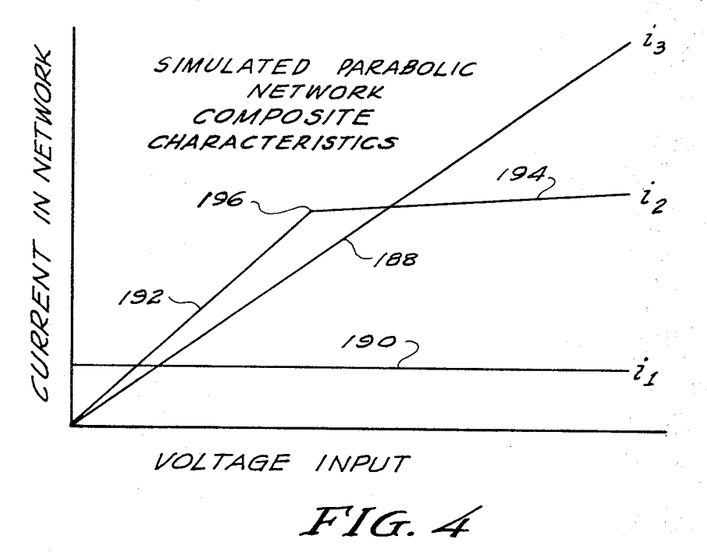
FIG. 4 is a graph of input voltage versus current in the network of FIG. 3, illustrating the synthesis of the final characteristic that is illustrated in FIG. 5.

The trio of resistors 182, 181 and 184 form a low impedance voltage divider for establishing requisite voltages at terminals 180 and 183. It may be seen that the currents $i_1$ and $i_3$ are easily calculated as the small constant voltage at terminal 183 divided by resistance 170 and the input voltage $e_{in}$ at 160 divided by resistance 174, respectively. The resistances 182, 181 and 184 are very much smaller than any of the resistors 170, 172 and 174 and have negligible effect on these currents. These currents are shown as lines 190 and 188, respectively in FIG. 4. The constant current $i_1$ establishes the starting level for the circuit above the base line, so that there is always a voltage output, even when the input voltage level $e_{in}$ is zero. At low counts, low threshold levels would result in considerable rejection of channel signals, and hence this is a beneficial feature of the parabolic-simulating network, aside from its enabling closer fitting to the true parabolic curve.

The current $i_2$, for small values of input voltage, is the input voltage divided by the total resistance of resistors 176 and 172. The diode $D_1$ is back biased for this condition. The voltage at terminal 178 is equal to the input voltage as attenuated by the voltage divider action of resistance 172 divided by the sum of resistances 172 and 176. When the voltage at 178 exceeds that at 180 by an amount sufficient to make diode $D_1$ conduct, the voltage at 178 will rise further by only a slight amount since the Thévenin equivalent of the terminal 180 has almost negligible resistance. Thus the curve representing current $i_2$ in FIG. 4 consisting of straight line segments 192 and 194 has a break at point 196, the point at which the diode $D_1$ begins to conduct. Above this point, the current $i_2$ is simply the voltage at terminal 178 (which is almost equal to the voltage at 180) divided by the resistance 172.

Figure 5:
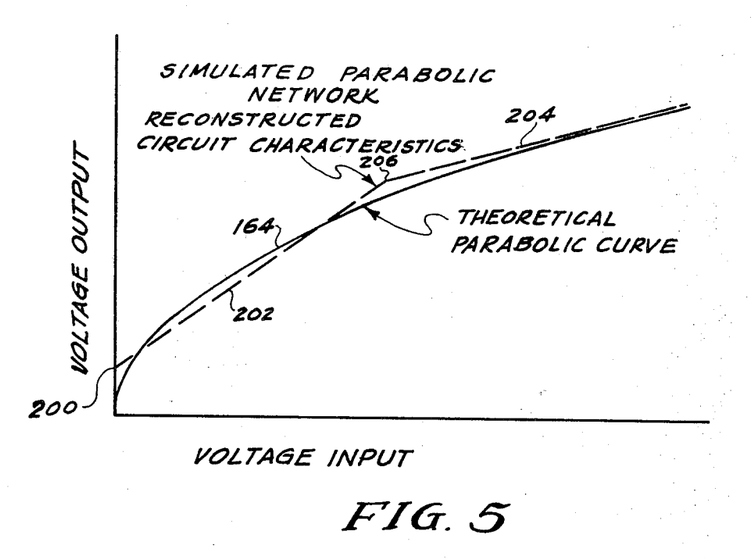
FIG. 5 is a graph of input voltage versus output voltage of the network of FIG. 3 but illustrating only the combined characteristic, a theoretically ideal curve of parabolic function being illustrated also to show the validity of the simulation.

The currents add to provide the current $i_t$ which will have a characteristic not much different from the broken line of FIG. 5, commencing at a voltage output that is substantially above zero at a value 200 which is several volts positive. The first part of the curve is designated 202 and the second part 204, with an elbow or change of slope at 206 occurring at the same point in time as the change in slope 196 of FIG. 4. No effort is made to adjust the charts of FIGS. 4 and 5 to lie on similar axes, but the illustrations are merely explanatory. The two lines 202 and 204 do not substantially depart from the theoretically perfect parabolic curve, and the overall voltage $e_o$ at the terminal 162, which is represented by the broken line curve, is quite satisfactory for most purposes. Those familiar with such circuits will observe that the output of the circuit of FIG. 3 will be negative for a positive input signal but it will also be apparent how any problems thus posed may easily be accounted for. In the claims where reference is made to parabolic circuits, any type of approximate circuit is included along with complex circuits designed to follow the theoretical curve quite faithfully.

Considering now FIG. 2, two curved lines are represented at 208 and 210. These lines represent the upper and lower limits of a run in which the parabolic circuit has been responsive to the average accumulated count and has thus adjusted the threshold circuit to limits which control differences which will result in a comparison signal that rejects or accepts. For example, the channels may be A and B of FIG. 1, the comparator involved may be the comparator 68 including the threshold circuit 84, the associated parabolic circuit being 124. As the voltage representing the accumulated counts of channels A and B increase, their average is represented by the line 64 to the left of the time $t_p$ and the threshold circuit 84 will produce no ouput signal at 86 unless one of the channel counts is above or below the limits 208 or 210 respectively. These limits define the range in which B must lie with respect to A to be acceptable. It should be understood that the differences can be caused by the change in either channel, but that the amplifier 80 will convert the difference into a negative signal to be passed or not by the threshold circuit 84.

In the actual structure, there would be only one limit-sensing device, but illustrating two limits helps the understanding. Also, the threshold level is in actuality very small compared to the average voltage of the line 64, so that for the counts generally observed in particle studies, the line 208 and 210 would diverge so slightly in the small chart as to be almost imperceptible. Th exaggeration is to be accepted as a method of explanation of the operation of the circuit.

Assume that the apertures of the channels A and B remain clear until the time $t_p$ at which point one of them, the aperture of channel B becomes plugged, so that from that point on the count of channel B increases at a reduced rate. The accumulated count signal of B now follows the line 66. The accumulated count signal of the channel A continues along the line 212 as a continuation of the line 64. The new count signal of channel B combined with the count of channel A produces an average count signal which will somewhat follow the line 214. The parabolic circuit will now provide new limits, these being proportional to the square root of the average represented by the line 214. The difference between the limits which would exist if there were no plugging and those which are produced because of the plugging are so minimal as to be practically imperceptable. There are actually sudden changes of slope in the lines 208 and 210 at the points 215 and 217 due to the sudden change of the slope of curve 64 at the time $t_p$. These changes cannot be seen.

After the time $t_p$ at which the channel B becomes plugged, the new count 66 combines with the count of channel A to provide a new average 214, and the newly established average causes the limits to change, the upper limit now following the line 216 and the lower limit now being the line 218. For a period of time, these new limits will not cause any rejection signal from the threshold circuit, since the difference signal will not carry beyond the limit, but at the time $t_r$ the B channel count departs so far from the count A channel (or from the average in other embodiments) that it produces a difference signal greater than the limit and a rejection signal is produced. This is indicated where the line 218 meets the line 66, representing the fact that the voltage of B has fallen below th limit established by the threshold circuit. The actual operation is a bit more complex, but this graphic representation illustrates approximately how the apparatus functions. The structure of FIG. 1 operates by comparing individual channels to get its difference voltage. This difference is an absolute value and the threshold limit relates to the average value because of the manner in which it is derived. In other circuits the difference between any one channel count and the average of all acceptable counts establishes the difference voltage and this may be related to a threshold limit established by an average value operating into the parabolic circuit.

In any event, after the difference between any two channels of FIG. 1 exceeds the threshold limit, there will be a voting operation as described, and the abnormal channel, channel B in this case, will be rejected. The channel A count may be averaged with that of another channel to eventually obtain a final average count at the time $t_f$, and this is symbolized by a continuation of the line 212 to the time $t_f$.

FIG. 6 illustrates a structure which has inherently greater accuracy and control. The one disadvantage is the problem of losing the complete statistical data of the run if one channel is lost and thereafter a transistory abnormality occurs. The structure has a feature which prevents such loss.

The lines 30, 32 and 34 of FIG. 6 are channel leads extending from pulse count accumulating circuits such as those shown in FIG. 1 at 24, 26 and 28, respectively. The differential comparators of FIG. 6 are the equivalent of the similarly numbered differential comparators of FIG. 1 and for ease in following the explanation, again the channels are designated A, B and C. Each of the differential comparators 68, 70 and 72 has a variable response limit and may be formed of the same components as in the case of FIG. 1, as for example, an absolute value differential amplifier and a threshold circuit. The blocks shown are the same as in FIG. 1 and carry the same reference numerals. Additionally, the output lines from the threshold circuits are at 86, 96 and 106. The direct channel connections are 36, 38 and 40 extending through the switches 42, 44 and 46, respectively, to the same type of averaging device 54 whose output will be the average accumulated count signal desired.

The input terminals of the differential comparators in FIG. 6 may be of two types. They can be arranged as in FIG. 1 with permutations of the channels A, B and C in which case they would have a degree of independence which previously has been discussed, but the difference signal generated by the amplifiers in such case will depend upon the count signals of only two channels in each comparator.

The second type of input to the differential comparators is a novel one in comparing each channel with the average of all, an arrangement which provides a greater degree of accuracy. In FIG. 6, there is a terminal 220 following the averaging device which will have the output of the averaging device appear as a voltage. This is an average of the accumulated count signals of all three channels, assuming that all are clearing through the switches 42, 44 and 46. Since this voltage represents more data, it is statistically more valid than any individual channel. One line 222 connects this terminal with each of the input lines 74, 76 and 78 so that the average count is compared in each case with a count derived from one of the channel leads 30, 32 and 34. Since all inputs are compared with the same reference, which contains information from all other acceptable channels, the voting logic network corresponding to block 88 of FIG. 1 degenerates to straight-through connections and is omitted from FIG. 6.

Another line 224 connects this terminal 220 with a single parabolic network 226 whose construction need not vary substantially from that of FIG. 3. The output of the parabolic network 226 is connected by way of the line 228 to the threshold circuits 84, 94 and 104 through their limit control input leads 128, 138 and 150, respectively. Accordingly, the same parabolic circuit responds to an average of all available accumulated count signals in order to establish the threshold level which will determine whether or not the differential comparators will produce an output as a comparison signal.

Since the parabolic circuit responds to an average which is obtained by measuring the accumulated count signals following the transmission of the signals through the switches 42, 44 and 46, there must be an output at the terminal 220 at all times for the parabolic circuit to establish a suitable threshold level and hence a limit for determining whether differences are acceptable in the differential comparators. Assuming that the block 231 is ignored, and that the leads 230, 232 and 234 extend directly to the switches 42, 44 and 46, respectively, in the same manner as the leads 118, 120 and 122 of FIG. 1, if one channel blocks, its switch would open and that channel's accumulated count signal would not be included in the average output at 220. This would assume operation of the circuit substantially as explained, and even if the one-out only matrix 231 were not used, the apparatus would continue to give the proper results, and the averaging of only two channels' counts would provide the needed signals for the parabolic network 226 and the bottom inputs to the amplifiers. Continuing with this suppositious set of conditions, if one channel is not operating, and there is a difference signal between the remaining two channels which indicates a blockage, the output of the corresponding threshold circuits will normally cut out both of these channels. The result will be that the voltage at 220 will drop to zero, the output of the parabolic network would drop to zero, the threshold circuits would have zero limit, and the entire circuit would be rendered inoperative so that no data could be derived from the circuit. This would be acceptable if in fact the difference between the two remaining channels was caused by a blockage, but if caused by merely a transitory abnormality which is merely a statistical variation, or by some insignificant short-time blockage which immediately cleared itself, the run would be lost anyway unless some steps were taken to prevent this.

In the case of the circuit of FIG. 1 in which the parabolic circuits derived their signals from a comparison of the permutation pairs, this self-repairing transitory abnormality would not result in a vitiation of the entire run. However, the circuitry is more expensive, and the accuracy is slightly less.

Accordingly, in the structure of FIG. 6, instead of permitting the outputs from the threshold circuits go to the switches via a voting logic network, such as the network 88 of FIG. 1, they pass through an interposed one-out only a matrix 231 which is made up of logic elements suitably connected to prevent total lock-out of the circuit. Leads 230, 232 and 234 are the connections to the one-out only matrix. The function of this circuit is to lock the remaining channels of the group of three into continuing operation as soon as one channel has been judged abnormal by the corresponding threshold circuit, due to an abnormality occurring. All that is required is to block any signals to the switch circuits of the other two channels. Specifically, if channel B is voted out, switches 42 and 46 will remain open irrespective of further outputs from any other thresholds. The leads from the one-out only matrix 231 to the respective switch circuits are 236, 238 and 240.

The effect of this arrangement is explained in connection with the chart or diagram of FIG. 7. What occurs is that the continuing occurrence of signals on the two remaining channels will provide an average for the parabolic circuit 226 so that the threshold circuits will still function. More importantly, if there is a transistory abnormality on one of the remaining channels, the run is not lost if the abnormality reverts to normal before the end of the count time.

In order to take into account the possible existence of an actual blockage in one of the remaining channels, a simple but effective logic element may be used to override the locked in operation of the channels. This element is the AND logic element 242 which has three input terminals connected by leads 244, 246 and 248 to the respective outputs 86, 96 and 106 of the differential comparators. If one channel is abnormal, that channel will have a comparison signal output providing one input signal for the AND element 242. Assume that channel B is out, then there will be a signal output at the lead 246 because the difference signal is a comparison between the B count and the average of the remaining two. Switch 44 is open under these circumstances. Now, suppose that there is an actual blockage in the channel C and its count changes so that when compared with the average of A and C there is a substantial difference which increases as time goes on. Since A and C are locked into operation, the signals still come through the switches 42 and 46 into the averaging device and still provide some threshold limits through the parabolic circuit 226. Again, there will also be a substantial difference between A and the average of A and C, which also increases as time goes on. Accordingly, there will be outputs from the respective differential comparators, appearing as input signals on the leads 244 and 248, and since all three inputs to the AND circuit 242 have the necessary signals, there will be an output on the lead 250.

The lead 250 controls the normally closed switch 252 which is between the lead 220 and the output terminal 254. With a true blockage and a signal at 250, the switch 252 opens and stays open to void the entire run.

Figure 7:
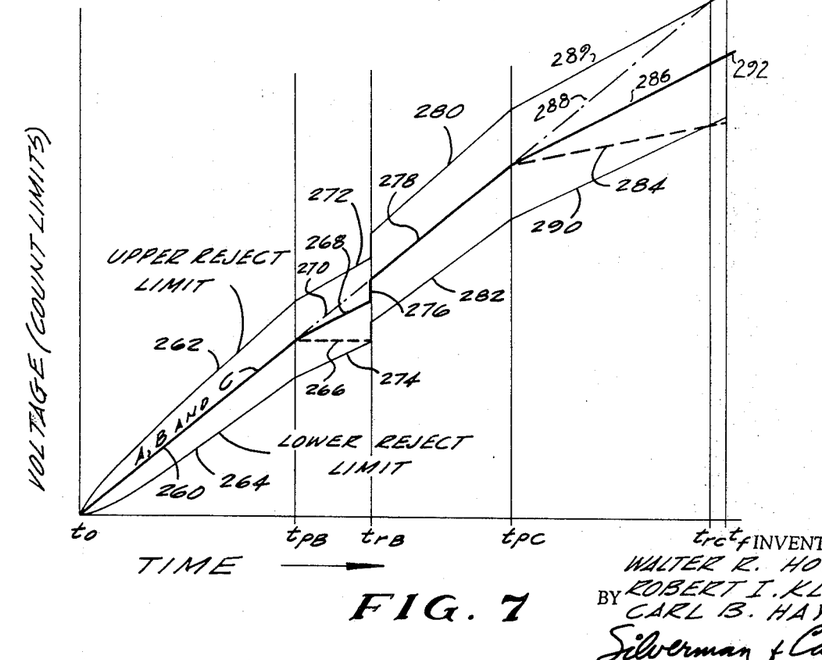
FIG. 7 is a graph or chart illustrating the performance of a structure of the general form illustrated in FIG. 6.

Looking now at FIG. 7, the vertical axis is voltage representing count signals, limits and the like. The horizontal axis represents a counting time, extending from the starting time $t_0$ to the final counting time $t_f$ which will be for example, four seconds. Again, as in the case of FIG. 2, the curvature and voltage differences are highly exaggerated for explanatory purposes.

To the left of the time $t_{\mathrm{pB}}$ the operation of the structure of FIG. 6 is normal. All three counts lie on substantially the same straight line 260 and this is the average of the counts, increasing with a uniform slope. The limits established by the single parabolic circuit are indicated by the curved lines 262 and 264, being the upper and lower limits respectively.

At the time $t_{\mathrm{pB}}$ the B channel becomes permanently blocked. The average of all three channels changes, since, while the A and C channels continue to produce the same rate of increased count as they did prior to the block, the B channel's count stops increasing. The new B channel count is represented by the broken line 266 which is horizontal, and the new average count for all three channels is the solid line 268, at a new slope less than before. The broken line 270 is an extension of the old average value line 260, representing approximately the two unblocked channel count average.

Since the parabolic circuit 226 responds to the average of all counts at the output 220, its output relates to the average line 268, the upper limit becoming the line 272 and the lower limit the line 274. It should be appreciated that the limit lines are actually parabolic curves, although even in an exaggerated drawing as this they are barely seen to be curved.

This situation obtains for a period of time that no limit in any threshold is exceeded. All threshold circuits have the same limit, which may not be true of the structure of FIG. 1.

At the time $t_{rB}$ the lower limit of the threshold circuit 94 of channel B is exceeded by the difference signal produced in the amplifier 90. The result is the operation of the switch 44 through the one-out only matrix 231. This results in a total rejection of the count signal from the channel B. At the same time, both of the other channels are locked into continuing operation by the matrix 231. The graph of FIG. 7 shows this, by having the average of the channels A and C jump up along the line 276 to the constant slope average line 278 which continues in time thereafter to the next incident which will be discussed. The new upper and lower limit lines then jump up to become 280 and 282 respectively, derived from the average count signal of channels A and C, substantially an extrapolation and continuation of the limits 262 and 264, respectively. This assumes that the channels A and C have been operating perfectly normally all through the portion of the timing period which has elapsed.

At the time $t_{pC}$ it is assumed that the aperture of the C channel has become plugged, and perhaps not as completely as in the case of the first channel B. Recall that from the time $t_{rB}$ forward, channel B is not in operation and contributed nothing to the average count signal at the terminal 220, this being at a voltage representing the average of the accumulated count signals of the channels A and C only. As soon as this occurs, the new count of the channel C rises at a lesser slope along the line 284. It may or may not be effective to void the data of the run depending upon the nature of the blockage and how long it persists. In this instance, it could be almost anything which slows down the rate of passage of particles through the aperture. If the statistical effect is bad, the run should be rejected, but if the statistics are good, that is, within the limits described through the use of the parabolic circuit, there appears to be no reason to reject it.

The new average of the accumulated counts includes both A and C, this being the solid line 286, assuming that the count A will follow the broken line 288 as a linear continuation of the line 278. The parabolic circuit responds to the new average, and hence from the time $t_{pC}$ forward, the new limits of the threshold circuits 84 and 104 will be the lines 289 and 290.

If neither channel count compared with the average of both exceeds the limits of the threshold circuits, the average line 286 will intersect the final count time $t_f$ at a voltage 292 which becomes the average accumulated count of the run. On the other hand, the output of both differential comparators will be changing since each will be comparing its own channel count with that of the average. The differences will increase at substantially the same rate, and will presently both exceed their respective thresholds at about the same time, which in this case is assumed to be $t_{rC}$ shortly before the end of the count period. If this should occur, the run is invalidated, the switch 252 opens at the time $t_{rC}$ and, when the output terminal 254 is examined by some piece of equipment which follows, there will be no signal to represent a count.

If on the other hand the channel counts should come back within the limits after the run has been invalidated, due to the difference between channels being constant while the acceptance limits increase parabolically, or because a line representing a count straightened with the vagaries of statistics, the switch 252 will re-close and a signal will appear at 254. This is possible only because the one-out only matrix 231 will still provide an average of the two channel counts by keeping the switches 42 and 46 closed, even though the switch 252 is open for a period of time. The average signal at 220 may not be of sufficient validity to justify its use in the equipment following the terminal 254, at the time the switch 252 operated, but it is still able to energize the parabolic circuit 226 since it is not affected by the switch 252. Accordingly, if the apertures should revert to normal operation sufficiently quickly and before the end of the run, the switch 252 may close and an output may be had. The criterion is the length of time that the one blocked aperture of the remaining two remained blocked, but in practice this will be a very small fraction of the total time, if the blockage is temporary. Certainly, statistical variations causing the operation of the switch 252 would be expected to be very short in duration.

Figure 8:
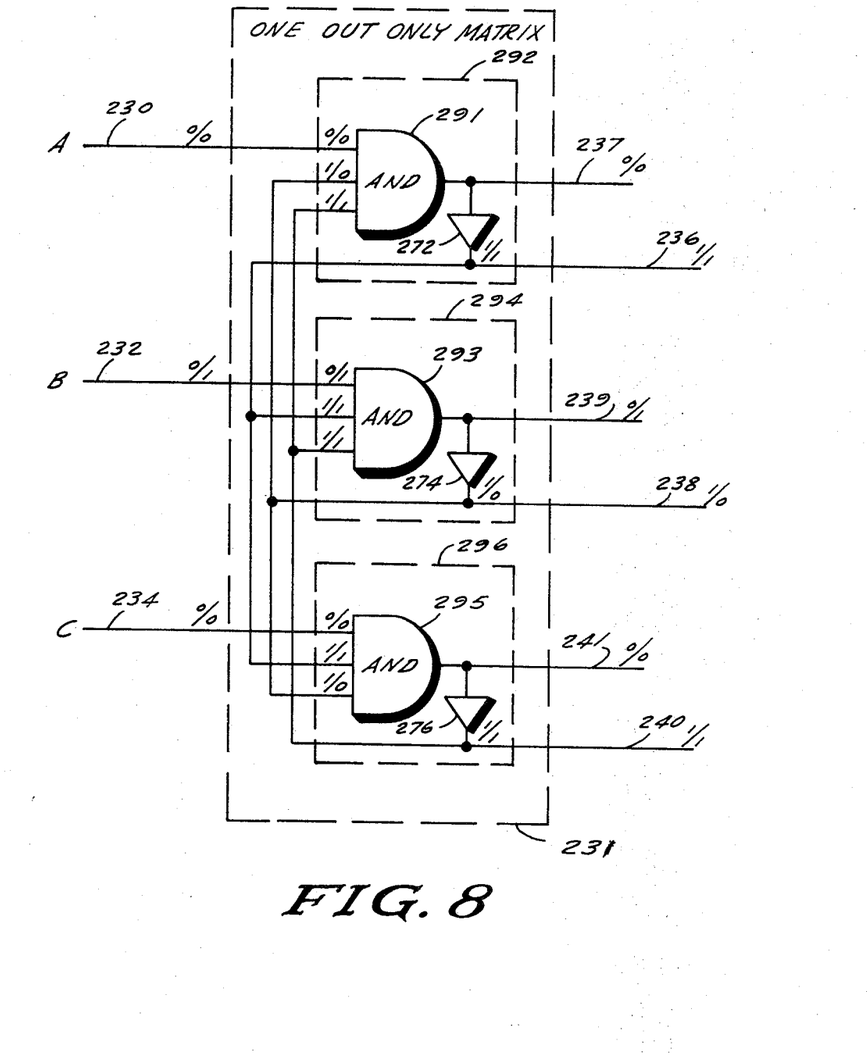
FIG. 8 is a fragmentary block diagram of a portion of the structure of FIG. 6.

The one-out only matrix 231 may be constructed in any suitable manner such as by the use of three three-input AND circuits with as many inverters, as shown in FIG. 8. For more than three channels, $n$ $n$-input AND's and $n$ inverters are required, when $n$ is the number of channels. If the following circuits, namely switches such as 42, 44, and 46 of FIG. 6 are based on negative logic as in a preferred embodiment incorporating n-channel junction field-effect transistors, with associated buffer amplifiers, NAND logic elements may be used, eliminating the need for the inverters 272, 274, and 276. The element combinations 292, 294 and 296 thus may be considered as NAND gates. If NAND gates are substituted for the discrete components in the boxes 292, 294 and 296, however, the output leads 237, 239 and 241 are not available.

The operation of this logic matrix may be understood by studying the combination of logical states given by the binary fractions shown in FIG. 8. Each of these fractions represents two possible states, the first, represented by the numerator of the fraction, being the state representing good information in all three count channels; the second, represented by the denominator of the fractions, being the state corresponding to bad information in channel B.

If positive logic is assumed, the output from the matrix would be taken from connections 237, 239 and 241 This might mean that a logical one at 230, 232, or 234 represented a malfunction in the corresponding channel and that a logical one at 237, 239 or 241 would open the corresponding switch 42, 44 or 46. It may be seen that logical zeroes at all input connections result in logical zeroes at all output connections 237, 239 and 247. This state represents good information in all three channels.

On the other hand, if channel B were blocked, this would result in the logical states represented by the denominators of the binary fractions. By studying these states, one may see that the logical one at connection 232 causes a logical one to appear at output connection 239, which in turn impresses at least a logical zero on the other two AND gates. Once the other AND gates have at least a zero input impressed upon them, they are prevented from anything but a logical zero output, as is desired. If NAND gates are used the polarities of the output signals are all reversed.

What it is desired to secure by Letters Patent of the United States is:

1. A voting structure for use in a particle counting apparatus in which there are at least three channels carrying discrete pulses generated in response to the passage of particles relative to a constricted electric current path, so that when operating normally, each channel will accumulate substantially the same count of pulses respectively, said voting structure arranged for detecting an abnormal count in any of the channels by comparison with the count in the other channels and for discarding the abnormal count, said voting structure comprising: a plurality of pulse count accumulating circuits each arranged to be separately connected to a respective channel and arranged to provide an accumulated count signal of the discrete pulses therein, a plurality of differential comparators each connected to and associated with at least one pulse count accumulating circuit in one specific channel and also connected to at least one other pulse count accumulating circuit in a different channel, each differential comparator having variable response limit means and arranged to provide a comparison signal between the accumulated count signal in its specific channel and the accumulated count signal of said other pulse count accumulating circuits connected thereto, signal averaging means connected to the pulse count accumulating circuits, a switch circuit interposed between each respective pulse count accumulating circuit and said signal averaging means and arranged to disconnect its channel from the averaging means when such channel produces an abnormal count, means responsive to the comparison signals to operate the switch circuit of a said specific channel when such channel produces an accumulated count signal that differs abnormally from the accumulated count signal of said other pulse count accumulating circuits, and means for varying the response limits of the differential comparators as a function of the deviation measured relative to the accumulated count signal of at least one of said pulse count accumulating circuits.

2. The voting structure as claimed in claim 1 in which the response limit varying means are connected to respond to the average accumulated count signal of at least two pulse count accumulating circuits.

3. The voting structure as claimed in claim 1 in which the response limit varying means are connected to respond to the average accumulated count signal of all said accumulating circuits.

4. The voting structure as claimed in claim 1 in which said response limit varying means comprise at least one circuit having a parabolic response such that its signal output is substantially proportional to the square root of its signal input, and means are provided for coupling the input of said parabolic response circuit to an accumulating circuit and for coupling the output in control relation to said differential comparators.

5. The voting structure as claimed in claim 1 in which the response limit varying means comprise a circuit having a parabolic response such that its signal output is substantially proportional to the square root of its signal input, means are provided for coupling the input of said parabolic response to said signal averaging means so as to receive as its signal input the average accumulated count of all said accumulating circuits, and said parabolic response circuit is coupled to all of said differential comparators to vary the response limits thereof.

6. The voting structure as claimed in claim 1 in which each differential comparator comprises a difference signal generator and a threshold circuit connected to pass the signal output therefrom, the threshold circuit level being variable to provide said variable response limit and said comparison signal being the output from said threshold circuit controlled by said limit.

7. The voting structure as claimed in claim 1 in which an average count signal computing device is connected to said other pulse count accumulating circuits whereby the accumulated count signal therefrom is an average value.

8. The voting structure as claimed in claim 3 in which means are provided to inhibit the operation of the switching circuits in the channels remaining in the event of the operation of said means responsive to comparison signals in disconnecting one abnormal count signal-producing channel from said signal averaging means.

9. The voting structure as claimed in claim 5 in which means are provided to inhibit the operation of the switching circuits in the channels remaining in the event of the operation of said means responsive to comparison signals in disconnecting one abnormal count signal-producing channel from said signal averaging means.

10. The voting structure as claimed in claim 7 in which means are provided to inhibit the operation of the switching circuits in the channels remaining in the event of the operation of said means responsive to comparison signals in disconnecting one abnormal count signal-producing channel from said signal averaging means.

11. A voting structure for use in a particle counting apparatus in which there are at least three channels carrying discrete pulses generated in response to the passage of particles relative to a constricted electric current path, so that when operating normally, each channel will accumulate substantially the same count of pulses respectively, said voting structure arranged for detecting an abnormal count in any of the channels by comparison with the count in the other channels and for discarding the abnormal count, said voting structure comprising: a plurality of pulse count accumulating circuits each arranged to be separately connected to a respective channel and arranged to provide an accumulated count signal of the discrete pulses therein, a differential comparator of variable response limit connected between the pairs of said accumulating circuits, there being a comparator for each of the pair permutations, each comparator adapted to provide a comparison signal proportional to the difference between the accumulated count signals of the pair of accumulating circuits connected thereto, signal averaging means connected to the pulse count accumulating circuits, a switch circuit interposed between each respective pulse count accumulating circuit and said signal averaging means and arranged to disconnect its channel from the averaging means when such channel produces an abnormal count, means responsive to the comparison signals to operate the switch circuit of a said specific channel when such channel produces an accumulated count signal that differs abnormally from the accumulated count signal of said other pulse count accumulating circuits, and means for varying the response limits of the differential comparators as a function of the deviation measured relative to the accumulated count signal of at least one of said pulse count accumulating circits.

12. The voting structure as claimed in claim 11 in which the response limit varying means are connected to respond to the average accumulated count signal of at least two pulse count accumulating circuits.

13. The voting structure as claimed in claim 11 in which the response limit varying means are connected to respond to the average accumulated count signal of all said accumulating circuits.

14. The voting structure as claimed in claim 11 in which said response limit varying means comprise at least one circuit having a parabolic response such that its signal output is substantially proportional to the square root of its signal input, and means are provided for coupling the input of said parabolic response circuit to an accumulating circuit and for coupling the output in control relation to said differential comparators.

15. The voting structure as claimed in claim 11 in which the response limit varying means comprise a circuit having a parabolic response such that its signal output is substantially proportional to the square root of its signal input, means are provided for coupling the input of said parabolic response circuit to said signal averaging means so as to receive as its signal input the average accumulated count of all said accumulating circuits, and said parabolic response circuit is coupled to all of said differential comparators to vary the response limits thereof.

16. The voting structure as claimed in claim 11 in which each differential comparator comprises a difference signal generator and a threshold circuit connected to pass the signal output therefrom, the threshold circuit level being variable to provide said variable response limit and said comparison signal being the output from said threshold circuit controlled by said limit.

17. The voting structure as claimed in claim 11 in which the response limit varying means comprise at least one circuit having a substantially parabolic response such that its signal output is substantially proportional to the square root of its signal input, in which each differential comparator comprises a difference signal generator and a threshold circuit connected to pass the signal output therefrom, the threshold circuit level being variable to provide the variable response limit and said comparison signal being the output from said threshold circuit controlled by said limit, and in which means are provided to couple the signal input of said parabolic response circuit to said one count accumulating circuit and the signal output thereof to said threshold circuits.

18. The voting structure as claimed in claim 12 in which each differential comparator comprises a difference signal generator and a threshold circuit connected to pass the signal output therefrom, the threshold circuit level being variable to provide said variable response limit and said comparison signal being the output from said threshold circuit controlled by said limit, in which the said response limit varying means comprise at least one circuit having a parabolic response such that its signal output is substantially proportional to the square root of its signal input, and in which means are provided for coupling the input of said parabolic response circuit to said two pulse count accumulating circuits to respond to the said average accumulated count thereof and for coupling the output of said parabolic response circuit to said threshold circuits.

19. The voting structure as claimed in claim 13 in which each differential comparator comprises a difference signal generator and a threshold circuit connected to pass the signal output therefrom, the threshold circuit level being variable to provide said variable response limit and said comparison signal being the output from said threshold circuit controlled by said limit, in which the said response limit varying means comprise at least one circuit having a parabolic response such that its signal output is substantially proportional to the square root of its signal input, and in which means are provided for coupling the input of said parabolic response circuit to all three of said accumulating circuits to respond to the said average accumulated count thereof and for coupling the output of said parabolic response circuit to said threshold circuits.

20. The voting structure as claimed in claim 19 in which the input coupling means include a connection from the signal averaging means to said parabolic response circuit.

21. The voting structure as claimed in claim 11 in which said last mentioned means comprise three response limit varying devices connected respectively to permutation pairs of pulse count accumulating circuits, and corresponding respectively to the permutation pairs of accumulating circuits of said differential comparators, in which pair averaging means are provided to average the accumulated pulse count signal of each pair whereby said device will be responsive to such average, and in which each device is connected to the differential comparator whose pair of circuits are the same as those of the device.

22. The voting structure as claimed in claim 21 in which each differential comparator comprises a difference signal generator and a threshold circuit connected to pass the signal output therefrom, the threshold level being variable to provide said variable response limit and said comparision signal being the output from said threshold circuit controlled by said limit.

23. The voting structure as claimed in claim 21 in which each response limit varying device comprises a circuit having a parabolic response such that its signal output is substantially proportional to the square root of its signal input, in which means are provided for coupling the input of each parabolic response circuit through said pair averaging means to its corresponding pair of pulse count accumulating circuits so as to receive said average of the accumulated pulse count signals from its pair as its signal input, and in which said connection of each device to a differential comparator comprises the connection of the output of a respective parabolic response circuit thereto.

24. The voting structure as claimed in claim 21 in which each differential comparator comprises a difference signal generator and a threshold circuit connected to pass the signal output therefrom, the threshold level being variable to provide said variable response limit and said comparison signal being the output from said threshold circuit controlled by said limit, in which each response limiting device comprises a circuit having a parabolic response such that its signal output is substantially proportional to the square root of its signal input, in which means are provided for coupling the input of each parabolic response circuit through said pair averaging means to its corresponding pair of pulse count accumulating circuits so as to receive said average of the accumulated pulse count signals from its pair as its signal input, and in which the connection of each device to a differential comparator comprises the connection of the output of the respective parabolic response circuits to the threshold circuit of the corresponding differential comparator.

25. The voting structure as claimed in claim 13 in which means are provided to inhibit the operation of the switching circuits in the channels remaining in the event of operation of said means responsive to comparison signals in disconnecting one abnormal count signal-producing channel from said signal averaging means.

26. The voting structure as claimed in claim 15 in which means are provided to inhibit the operation of the switching circuits in the channels remaining in the event of operation of said means responsive to comparison in disconnecting one abnormal count signal-producing channel from said signal averaging means.

27. A multiple channel particle analyzing device comprising a plurality of channels and means to produce pulses in each channel responsive to the passage of particles relative to a detector, the pulses of each channel being representative of a count in each channel and the device being arranged to provide an output that is the average of counts in all channels, comprising:
 (A) each channel having a circuit for converting the pulses in its channel into an accumulated pulse count signal,
 (B) an averaging device including output means,
 (C) a connection from each converting circuit to the averaging device and having a normally closed switch therein so that for normal operation of all channels, the count signals will be averaged and produce an output signal at said output means,
 (D) A voting circuit for detecting and discarding the count of any channel which acquires an abnormal count, said voting circuit comprising:
  (i) a differential comparator in each chanel having two input terminals, and including a response limit circuit to pass only difference signals exceeding the limit of said limit circuit, and having output connections to the respective switches,
  (ii) one input terminal of each comparator being connected with a respective converting means, the second input terminal of all comparators being connected to said output means to respond to the average count thereat, and (iii) means for adjusting the said response limit.

28. The structure as claimed in claim 27 in which there is a one-out only matrix between said differential comparators and the switches to prevent opening of all of said switches but the first one opened by an abnormal count signal in its channel.

29. The structure as claimed in claim 27 in which there is a parabolic function circuit connected between said output means and said response circuits to establish the limits thereof as a function of the average count signal appearing at said output means.

30. The structure as claimed in claim 28 in which there is an average signal output terminal connected with said output means and having a normally closed control switch between the output terminal and output means, there is multiple input AND logic element having input connections with the respective outputs of said comparators and an output connection to said control switch so that in the event all comparators have output signals representative of abnormal counts in all channels, the control switch will be opened.

31. The structure as claimed in claim 27 in which there are parabolic function response means coupled to said channels to produce an output related to total count signal in at least one channel and connected to said response limit circuits.

32. A voting circuit for use with a particle counting apparatus in which there are at least three channels, each channel including signal-producing means responsive to the passage of particles relative to the passage of particles relative to a constricted electric current path to produce pulses respectively for the particles so moving, each channel having means to accumulate a count only of pulses from the same particle sample so that if the signal-producing means of each channel are operating normally, each channel will accumulate substatially the same count of pulses, respectively, said voting circuit being for the purpose of detecting an abnormal count in any one channel by comparison with others and discarding the abnormal count, each channel also having a pulse count accumulating circuit connected in each channel to accumulate an electrical quantity proportional to the count of its signal-producing means and to provide an accumulated count signal corresponding thereto, there being an averaging device providing an average count output connected to all pulse accumulating circuits, said voting circuit including:

(A) a plurality of differential comparators, each differential comparator having a variable response limit and network means for connecting each comparator to one respective accumulating circuit and to accumulating circuit means which comprise at least one other accumulating circuit and at most all accumulating circuits including said one, each comparator adapted to provide a comparison signal between the accumulated count signal of said one and the accumulated count signal of said accumulating circuit means connected thereto, (B) switching means for opening any one or more of the connections between pulse accumulating circuits and said averaging device, (C) a voting logic network responsive to comparison signals to operate said switching means when any channel produces an abnormal accumulated count signal to open the connection in the abnormal count channel, and (D) means for varying the response limits of the differential comparators as a function of the deviation measured relative to substantially the accumulated count signal of at least one accumulating circuit.

33. The voting circuit of claim 32 in which the response limit varying means are connected to respond to the average accumulated count signal of at least two pulse count accumulating circuits.

34. The voting circuit as claimed in claim 32 in which the response limit varying means are connected to the output of the averaging device to respond to the average accumulated count signal of all channels.

35. A method for counting particles comprising the steps of:

(A) passing the particles through a plurality of logically parallel channels, (B) detecting the passage of each particle through its respective channel, (C) accumulating the particle count for each channel, (D) differentially comparing the particle count for each channel with the particle count of at least one of the other channels, (E) responding to at least the first differential comparison which exceeds a variable response limit, (F) adjusting said variable response limit as a function of the averaged accumulated particle count of at least two of the channels, (G) discarding the count in at least the first channel which causes a differential comparison to exceed the variable response limit, and (H) averaging for readout purposes the accumulated count in the channels which were not subject to said discarding.

References Cited

UNITED STATES PATENTS 3,420,993   1/1969   Chamberlain et al. __ 328—147 X

EDWARD E. KUBASIEWICZ, Primary Examiner

U.S. Cl. X.R.

235—92; 328—146